(12) United States Patent
Tanaka

(10) Patent No.: US 7,079,332 B2
(45) Date of Patent: Jul. 18, 2006

(54) LENS TILT ADJUSTING MECHANISM

(75) Inventor: Hitoshi Tanaka, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 11/156,728

(22) Filed: Jun. 21, 2005

(65) Prior Publication Data

US 2005/0280908 A1    Dec. 22, 2005

(30) Foreign Application Priority Data

Jun. 21, 2004   (JP)   ............................. 2004-182988
Jun. 21, 2004   (JP)   ............................. 2004-182989

(51) Int. Cl.
*G02B 7/02* (2006.01)

(52) U.S. Cl. ........................ 359/822; 359/811; 359/819

(58) Field of Classification Search ................ 359/822, 359/811, 813, 814, 819, 821, 823, 824, 825, 359/826

See application file for complete search history.

(56) References Cited

U.S. PATENT DOCUMENTS 6,130,788 A    10/2000   Nomura et al. ............. 359/694
6,318,912 B1   11/2001   Shono et al. ............... 396/342

FOREIGN PATENT DOCUMENTS

JP           6-23013          3/1994

*Primary Examiner*—Timothy Thompson
(74) *Attorney, Agent, or Firm*—Greenblum & Bernstein, P.L.C.

(57) ABSTRACT

A lens tilt adjusting mechanism includes a lens frame to which at least one lens element is fixed, a lens frame holder which holds the lens frame, axially-opposed radial surfaces formed on the lens frame and the lens frame holder, respectively, a biasing device for biasing the lens frame and the lens frame holder in directions to make the axially-opposed radial surfaces contact each other, and a protrusion formed on one of the axially-opposed radial surfaces and a recess formed on the other of the axially-opposed radial surfaces. The axially-opposed radial surfaces are in intimate contact with each other when the protrusion and the recess are engaged with each other, and the lens frame tilts relative to the lens frame holder when the protrusion is disengaged from the recess so that the protrusion is in contact with the other of the axially-opposed radial surfaces.

17 Claims, 8 Drawing Sheets

LENS TILT ADJUSTING MECHANISM

BACKGROUND OF THE INVENTION

1. Field of the Invention

The present invention relates to a lens tilt adjusting mechanism for adjusting the tilt angle of a lens (a lens element or a lens group).

2. Description of the Related Art

Lens tilt adjustment for adjusting the tilt of the optical axis of a lens element or a lens group relative to the optical axis (reference axis) of a lens system is known as a lens system adjusting method. For instance, in a conventional lens tilt adjustment, a lens frame to which at least one lens element is fixed and a lens frame holder which holds the lens frame are provided with two axially-opposed radial surfaces, respectively, and the conventional lens tilt adjustment is performed by inserting a tilt adjusting spacer (tilt adjusting member/tilt adjusting piece) selected from among a plurality of tilt adjusting spacers having different thicknesses between the axially-opposed radial surfaces at a specified circumferential position therebetween. Upon completion of this lens tilt adjustment, the lens frame and the lens holder are fixed to each other by a fixing device such as set screw or adhesive.

However, the workability of the lens tilt adjustment using a tilt adjusting spacer is not very good because it is difficult to handle a small independent tilt adjusting spacer.

Specifically, in conventional lens tilt adjusting mechanisms using tilt adjusting spacer, the workability of installing (inserting) and removing the tilt adjusting spacer is not very good, the fixing operation for fixing the lens frame and the lens holder to each other is complicated, and the direction of tilting the lens for adjustment is limited.

SUMMARY OF THE INVENTION

The present invention provides a lens tilt adjusting mechanism which has a simple structure using no tilt adjusting spacer, which makes it possible to adjust the tilt angle of the optical axis of a lens element or a lens group simply by a relative rotation between the lens frame and the lens frame holder, and which makes it easy for the tilting direction of the lens element or the lens group for adjustment to be freely selected.

The present invention further provides a simple lens tilt adjusting mechanism which is superior to conventional lens tilt adjusting mechanisms in both workability of installing and removing the tilt adjusting spacer and workability of the lens tilt adjusting operation, and which makes it easy for the tilting direction of the lens element or the lens group for adjustment to be freely selected.

According to the present invention, a lens tilt adjusting mechanism is provided, including a lens frame to which at least one lens element is fixed, a lens frame holder which holds the lens frame, axially-opposed radial surfaces formed on the lens frame and the lens frame holder, respectively, a biasing device for biasing the lens frame and the lens frame holder in directions to make the axially-opposed radial surfaces contact each other, and a protrusion formed on one of the axially-opposed radial surfaces and a recess formed on the other of the axially-opposed radial surfaces. The axially-opposed radial surfaces are in intimate contact with each other in a state where the protrusion and the recess are engaged with each other. The lens frame tilts relative to the lens frame holder in a state where the protrusion is disengaged from the recess so that the protrusion is in contact with the other of the axially-opposed radial surfaces.

It is desirable for each of the axially-opposed radial surfaces to lies in a plane substantially orthogonal to an optical axis of the lens element.

The biasing device can be a coil spring. Alternatively, the biasing device can be a C-shaped resilient ring.

It is desirable for the lens tilt adjusting mechanism to include radially-opposed cylindrical surfaces formed on the lens frame and the lens frame holder, respectively, each of the radially-opposed cylindrical surfaces having an axial center coincident with an optical axis of the lens element. The biasing device further includes radially-opposed annular grooves formed on the radially-opposed cylindrical surfaces, respectively. The C-shaped resilient ring is installed in between the radially-opposed annular grooves to extend therealong.

It is desirable for the lens frame holder to be screw-engaged with a lens moving cylinder so that the position of the lens frame holder relative to the lens moving cylinder in an optical axis direction can be adjusted by adjusting the amount of screw-engagement of the lens frame holder with the lens moving cylinder.

It is desirable for the lens tilt adjusting mechanism to be incorporated in a zoom lens.

It is desirable for the lens frame holder to be guided along an optical axis of the zoom lens without rotating about the optical axis.

In an embodiment, a lens tilt adjusting mechanism is provided, including a lens frame to which at least one lens element is fixed, a lens frame holder which holds the lens frame, axially-opposed radial surfaces formed on the lens frame and the lens frame holder, respectively, a biasing device for biasing the lens frame and the lens frame holder in directions to make the axially-opposed radial surfaces contact each other, a spacer insertion groove formed on the axially-opposed radial surface of the lens frame, a depth of the spacer insertion groove extending in a radial direction of the lens frame, and a tilt adjusting spacer selectively inserted in the spacer insertion groove. The axially-opposed radial surfaces are in intimate contact with each other in a state where the tilt adjusting spacer is not inserted in the spacer insertion groove. The lens frame tilts relative to the lens frame holder by a tilting angle corresponding to the thickness of the tilt adjusting spacer in a state where the tilt adjusting spacer is inserted in the spacer insertion groove.

It is desirable for each of the axially-opposed radial surfaces to lie in a plane substantially orthogonal to an optical axis of the lens element.

It is desirable for the lens tilt adjusting mechanism to include radially-opposed cylindrical surfaces formed on the lens frame and the lens frame holder, respectively, each of the radially-opposed cylindrical surfaces having an axial center coincident with an optical axis of the lens element. The biasing device further includes radially-opposed annular grooves formed on the radially-opposed cylindrical surfaces, respectively. The C-shaped resilient ring is installed in between the radially-opposed annular grooves to extend therealong.

It is desirable for the lens tilt adjusting mechanism to include a recess which is formed on the axially-opposed radial surface of the lens frame holder to correspond to the position of the spacer insertion groove of the lens frame, the tilt adjusting spacer being engageable in the recess.

It is desirable for the lens frame holder to be screw-engaged with a lens moving cylinder so that the position of the lens frame holder relative to the lens moving cylinder in an optical axis direction can be adjusted by adjusting the amount of screw-engagement of the lens frame holder with the lens moving cylinder.

It is desirable for the lens tilt adjusting mechanism is incorporated in a zoom lens.

It is desirable for the lens frame holder to be guided along an optical axis of the zoom lens without rotating about the optical axis.

According to an aspect of the present invention, there is no need for either the lens frame or the lens frame holder to be rotated relative to the other when it is not necessary to make any lens tilt adjustment to the lens. However, if it is necessary to make a lens tilt adjustment on the lens, the lens tilt adjustment can be performed via a relative rotation between the lens frame and the lens frame holder, and also the tilting direction of the lens for adjustment can be selected by selecting the angle of the relative rotation therebetween.

According to another aspect of the present invention, no tilt adjusting spacer needs to be installed in the spacer insertion groove when the lens tilt adjustment does not need to be performed (the positions of the tilt adjusting spacer and the recess, in which the spacer is engageable, are made to correspond to each other when the spacer groove is formed on the lens frame holder), and the lens tilt adjustment can be performed by installing the tilt adjusting spacer in the spacer insertion groove when the lens tilt adjustment needs to be performed (the positions of the tilt adjusting spacer and the recess are made not to correspond to each other when the spacer groove is formed on the lens frame holder). Moreover, the tilting amount of for adjustment can be adjusted by selecting a tilt adjusting spacer having an appropriate thickness, while the direction of tilting the lens for adjustment can be selected by selecting the angle of the relative rotation therebetween.

The present disclosure relates to subject matter contained in Japanese Patent Applications Nos. 2004-182988 and 2004-182989 (both filed on Jun. 21, 2004) which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENTS

Figure 1:
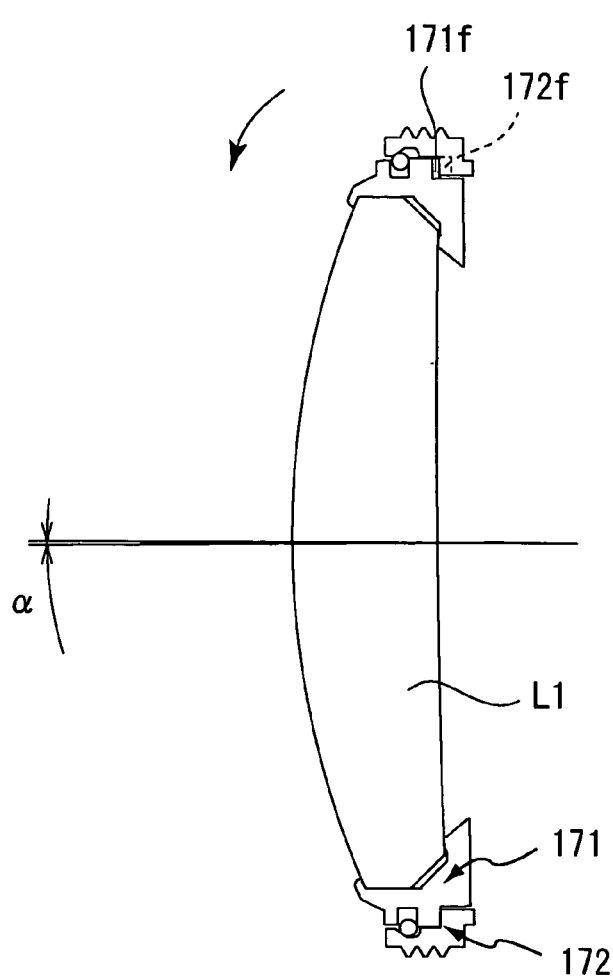
FIG. 1 is a longitudinal sectional view of a first embodiment of a lens tilt adjusting mechanism according to the present invention that includes a lens frame to which a lens group is fixed, a lens frame holder which holds the lens frame, and a C-shaped resilient ring (biasing device) installed between the lens frame and the lens frame holder, showing the lens tilt adjusting mechanism in a tilt-angle adjusted state.
Figure 2:
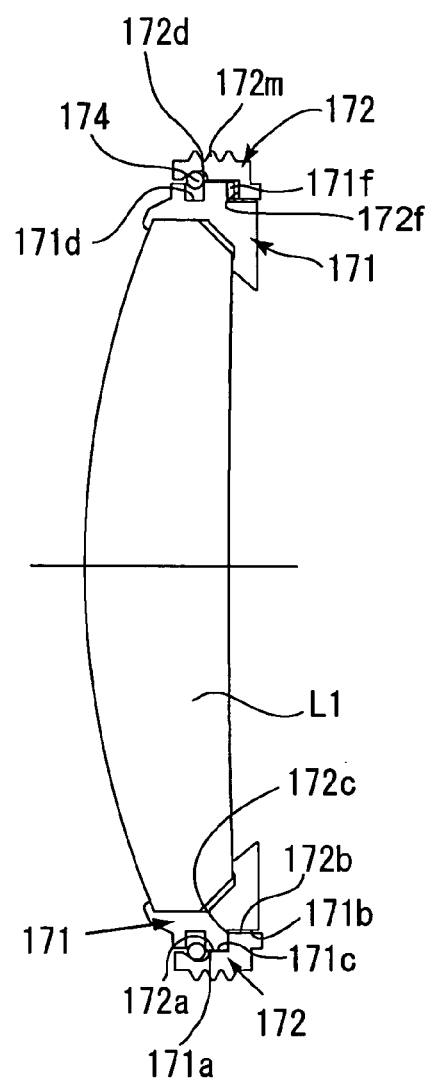
FIG. 2 is a view similar to that of FIG. 1, showing the lens tilt adjusting mechanism in a tilt-angle non-adjusted state.
Figure 3:
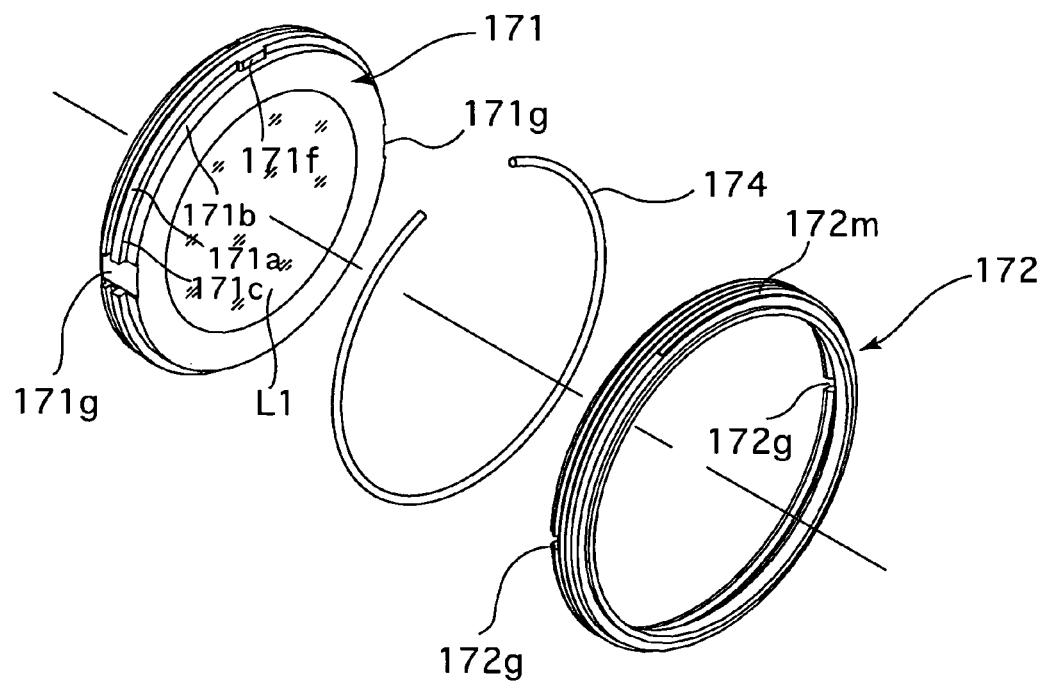
FIG. 3 is an exploded perspective view of the lens tilt adjusting mechanism.
Figure 4:
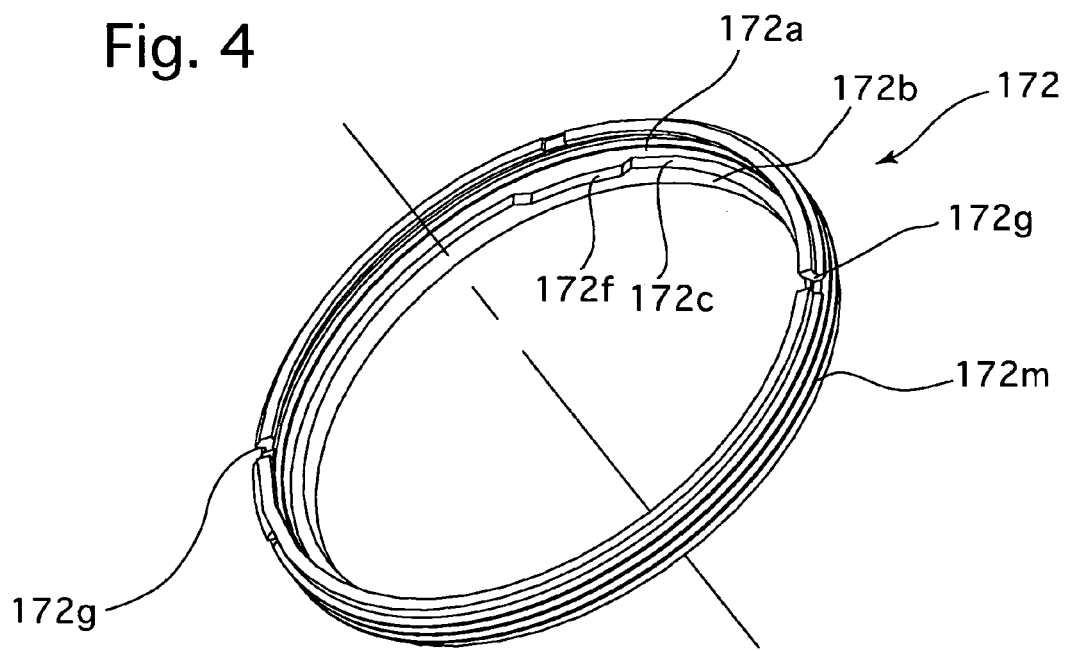
FIG. 4 is a perspective view of the lens frame holder.

The overall structure of a zoom lens (zoom lens barrel) 10 to which a first embodiment of a lens tilt adjusting mechanism is applied will be hereinafter discussed with reference to FIGS. 12 through 15. An optical system of the zoom lens 10 is made as a zoom lens system including a first lens group L1, a second lens group L2, a third lens group L3 and a fourth lens group L4 which are arranged in that order from the object side (the left side as viewed in each of FIGS. 13 through 15). The first lens group L1, the second lens group L2 and the third lens group L3 serve as lens groups for performing a focal-length varying operation (zooming operation), while the four lens group L4 serves as a focusing lens group both for compensating for deviation in the focus of the zoom lens system when the zooming operation is performed and for bringing an object into focus when a focusing operation is performed.

The zoom lens 10 is provided with a CCD holder 11, a housing 12 fixed to the front of the CCD holder 11, and a rotation limit ring 13 fixed to the front end of the housing 12. The CCD holder 11, the housing 12 and the rotation limit ring 13 are immovable (fixed) elements. A CCD image sensor 11a and a pair of fourth-lens-group linear guide shafts 11b are fixed to the CCD holder 11. The zoom lens 10 is provided with a fourth lens group support frame 14 to which the fourth lens group L4 is fixed. The fourth lens group support frame 14 is linearly guided by the pair of fourth-lens-group linear guide shafts 11b in a direction of an optical axis O of the zoom lens 10.

The housing 12 is provided on an inner peripheral surface thereof with a female helicoid 12a and a plurality of linear guide grooves 12b parallel to the optical axis O. The zoom lens 10 is provided with a cam ring 15 which is provided, on an outer peripheral surface thereof in the vicinity of the rear end of the cam ring 15, with a male helicoid 15a which is in mesh with the female helicoid 12a. The cam ring 15 is provided on threads of the male helicoid 15a with a spur gear 15b which is engaged with a pinion (not shown) fixed on a rotary shaft of a reversible motor 12c fixed to the housing 12. Therefore, forward and reverse rotations of the reversible motor 12c cause the cam ring 15 to move forward and rearward in the optical axis direction while rotating forward and reverse, respectively, due to the engagement of the male helicoid 15*a* with the female helicoid 12*a*. The cam ring 15 is the only rotatable member among all the elements of the zoom lens 10.

The zoom lens 10 is provided around the cam ring 15 with a linear guide ring 16 which is engaged with the cam ring 15 via a bayonet coupling so that the cam ring 15 and the linear guide ring 16 move together in the optical axis direction while allowing the cam ring 15 to rotate relative to the linear guide ring 16. The linear guide ring 16 is provided on an outer peripheral surface thereof with a plurality of linear guide projections 16*a* which are engaged in the plurality of linear guide grooves 12*b* of the housing 12, respectively, so that the linear guide ring 16 linearly moves in the optical axis direction while allowing the cam ring 15 to rotate relative to the linear guide ring 16 when the cam ring 15 moves forward or rearward in the optical axis direction while rotating.

The linear guide ring 16 is provided on an inner peripheral surface thereof with a plurality of linear guide grooves 16*b*. The zoom lens 10 is provided with a first lens group moving cylinder (lens moving cylinder) 17 for supporting the first lens group L1. The first lens group moving cylinder 17 is provided, on an outer peripheral surface thereof in the vicinity of the rear end of the first lens group moving cylinder 17, with a plurality of linear guide projections 17*a* which are engaged in the plurality of linear guide grooves 16*b*, respectively. The first lens group moving cylinder 17 is provided with an inner cylindrical portion and an outer cylindrical portion which are connected together via a radial wall positioned at the front end of the first lens group moving cylinder 17. The cam ring 15 is provided with a cylindrical cam portion positioned between the inner cylindrical portion and the outer cylindrical portion of the first lens group moving cylinder 17. The zoom lens 10 is provided between the linear guide ring 16 and the first lens group moving cylinder 17 with a lens barrier support cylinder 18. The lens barrier support cylinder 18 is provided on an inner peripheral surface thereof with a plurality of linear guide projections (not shown) which are respectively engaged in a plurality of guide grooves 17*b* formed on the first lens group moving cylinder 17. The zoom lens 10 is provided at the front end of the lens barrier support cylinder 18 with a lens barrier unit 18*a* which is fitted into the front end of the lens barrier support cylinder 18 to be fixed thereto.

The zoom lens 10 is provided with a second lens group moving frame 19 which is fitted in the inner cylindrical portion of the first lens group moving cylinder 17 to be linearly guided in the optical axis direction. The zoom lens 10 is provided radially inside the second lens group moving frame 19 with a third lens group moving frame 20 which is linearly guided by the second lens group moving frame 19 in the optical axis direction. The third lens group moving frame 20 supports the third lens group L3 and a shutter unit 20*a*. A lens frame 171 to which the first lens group L1 is fixed is supported by the first lens group moving cylinder 17, while a second lens group support frame 19*a* to which the second lens group L2 is fixed is secured to the second lens group moving frame 19 by the engagement of a male screw thread formed on the second lens group support frame 19*a* with a female screw thread formed on the second lens group moving frame 19.

In the above described embodiment of the zoom lens, the linear guide ring 16 is linearly guided in the optical axis direction by the housing 12, the first lens group moving cylinder 17 is linearly guided in the optical axis direction by the linear guide ring 16, the lens barrier support cylinder 18 and the second lens group moving frame 19 are linearly guided in the optical axis direction by the first lens group moving cylinder 17, and the third lens group moving frame 20 is linearly guided in the optical axis direction by the second lens group moving frame 19.

The cam ring 15 is provided on an outer peripheral surface thereof with a plurality of first cam grooves C1 for moving the lens barrier support cylinder 18 and a plurality of second cam grooves C2 for moving the first lens group moving cylinder 17. The cam ring 15 is provided on an inner peripheral surface thereof with a plurality of third cam grooves C3 for moving the second lens group moving frame 19 and a plurality of fourth lens grooves C4 for moving the third lens group moving frame 20. A plurality of first followers 17*f*, a plurality of second followers 18*f*, a plurality of third followers 19*f* and a plurality of fourth followers 20*f* which are engaged in the plurality of first cam grooves C1, the plurality of second cam grooves C2, the plurality of third cam grooves C3, and the plurality of fourth cam grooves C4, respectively, are fixed to or formed on the first lens group moving cylinder 17, the lens barrier support cylinder 18, the second lens group moving frame 19 and the third lens group moving frame 20, respectively. Each of the first lens group moving cylinder 17, the lens barrier support cylinder 18, the second lens group moving frame 19 and the third lens group moving frame 20 is linearly guided in the optical axis direction as mentioned above, and rotating the cam ring 15 causes each of the first lens group moving cylinder 17, the lens barrier support cylinder 18, the second lens group moving frame 19 and the third lens group moving frame 20 to move linearly in the optical axis direction in accordance with the contours of the associated cam grooves and the associated followers so that a focal length varying operation (zooming operation) or a lens barrel retracting operation is carried out. In addition, the fourth lens group support frame 14, which supports the fourth lens group L4, is driven in the optical axis direction by a stepper motor 12*d* fixed to the housing 12 in accordance with data on focus shift caused by a variation of the focal length and data on object distance.

The first embodiment of the lens tilt adjusting mechanism is applied to the first lens group L1 that is supported by the first lens group moving cylinder 17 of the above described zoom lens 10, and is shown in FIGS. 1 through 4. The first lens group L1 is fixed to the lens frame 171 by adhesive or by partly swaging (heat crimping) the lens frame 171. A lens frame holder 172 serving as an intermediate cylindrical member is positioned between the lens frame 171 and the first lens group moving cylinder 17. Each of the first lens group moving cylinder 17, the lens frame 171 and the lens frame holder 172 is substantially rotation-symmetrical about the optical axis O.

The lens frame holder 172 is provided on an outer peripheral surface thereof with a male thread portion 172*m*, while the first lens group moving cylinder 17 is provided on an inner peripheral surface thereof with a female thread portion 17*d* which is engaged with the male thread portion 172*m* of the lens frame holder 172. The lens frame holder 172 is provided on an inner peripheral surface thereof with a large-diameter inner circumferential surface portion 172*a*, a small-diameter inner circumferential surface portion 172*b* and an annular radial surface 172*c* which connects the large-diameter inner circumferential surface portion 172*a* with the small-diameter inner circumferential surface portion 172*b*. On the other hand, the lens frame 171 is provided oh an outer peripheral surface thereof with a large-diameter outer circumferential surface portion 171*a*, a small-diameter outer circumferential surface portion 171*b* and an annular radial surface 171*c* which connects the large-diameter outer circumferential surface portion 171a with the small-diameter outer circumferential surface portion 171b. The large-diameter outer circumferential surface portion 171a, the small-diameter outer circumferential surface portion 171b and the annular radial surface 171c correspond to the large-diameter inner circumferential surface portion 172a, the small-diameter inner circumferential surface portion 172b and the annular radial surface 172c, respectively.

The large-diameter outer circumferential surface portion 171a of the lens frame 171 and the large-diameter inner circumferential surface portion 172a of the lens frame holder 172 are cylindrical surfaces about the optical axis O and face each other, while the annular radial surface 171c and the annular radial surface 172c are radial surfaces each of which lies in a plane orthogonal to the optical axis O. The large-diameter outer circumferential surface portion 171a and the large-diameter inner circumferential surface portion 172a are provided thereon with annular grooves 171d and 172d, respectively, which face each other. A C-shaped resilient ring 174 made of metal which serves as a biasing device is installed in between the annular grooves 171d and 172d to bias the lens frame 171 and the lens frame holder 172 in directions to bring the annular radial surface 171c and the annular radial surface 172c into contact with each other (or in directions to make the positions of the annular grooves 171d and 172d coincident with each other in the optical axis direction) by the spring force of the C-shaped resilient ring 174.

The annular radial surface 171c is provided at circumferential position thereon with a protrusion 171f which projects toward the annular radial surface 172c (rightward as viewed in FIG. 2), while the annular radial surface 172c is provided at one circumferential position thereon with a recess 172f (see FIG. 4) formed to correspond to the protrusion 171f. In a state where the protrusion 171f is engaged in the recess 172f, neither of the protrusion 171f nor the recess 172f prevents the annular radial surface 171c and the annular radial surface 172c from closely contacting each other, and accordingly, the axes of the lens frame 171 and the lens frame holder 172 remain coincident with each other (or remain parallel to each other) (see FIG. 2).

On the other hand, in a state where the protrusion 171f is disengaged from the recess 172f and is in contact with the annular radial surface 172c, the axis of the lens frame 171 and the axis of the lens frame holder 172 are inclined to each other. Namely, if the axis of the lens frame holder 172 is regarded as a reference axis corresponding to the optical axis O of the optical system of the zoom lens 10, the axis of the lens frame 171 (i.e., the optical axis of the first lens group L1) tilts relative to the optical axis O by angle α (see FIG. 1). The direction of this tilting can be changed by changing the rotational position of the lens frame 171 relative to the lens frame holder 172 (i.e., by changing the point of contact of the protrusion 171f with the annular radial surface 172c in a circumferential direction thereof). The C-shaped resilient ring 174 does not come off between the annular grooves 171d and the 172d during the above described lens tilt adjustment, and accordingly, the C-shaped resilient ring 174 continuously biases the lens frame 171 and the lens frame holder 172 in directions to make the annular radial surface 171c and the annular radial surface 172c contact each other. The lens frame 171 can be rotated relative to the lens frame holder 172 with the use of a pair of opposite recesses 171g (see FIG. 3) which are formed on an outer peripheral surface of the lens frame 171 on 180-degree radially opposite sides thereof so that the lens frame 171 can be rotated with the use of, e.g., a pin face wrench (not shown) with a pair of pins thereof being engaged in the pair of recesses 171g.

Although the annular radial surface 171c and the annular radial surface 172c are biased by the spring force of the C-shaped resilient ring (biasing device) 174 in directions to bring the annular radial surface 171c and the annular radial surface 172c into contact with each other in the above illustrated embodiment of the zoom lens shown in FIGS. 1 through 4, there is a high degree of flexibility in the biasing device, namely, the biasing device is not limited solely to such a particular type of biasing device.

Figure 5:
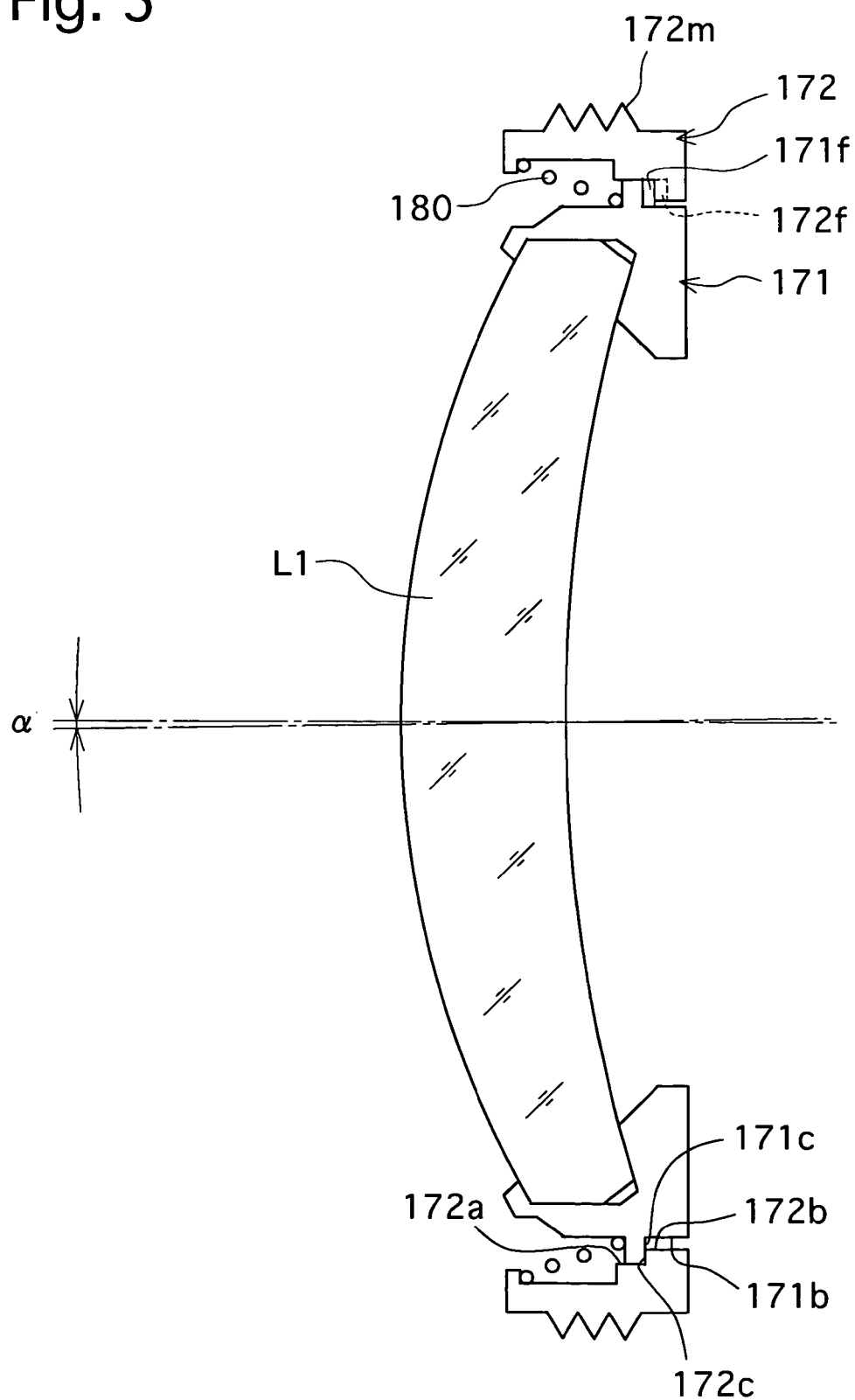
FIG. 5 is a longitudinal sectional view of a second embodiment of the lens tilt adjusting mechanism according to the present invention, wherein the biasing device is a compression coil spring.

FIG. 5 shows a second embodiment of the lens tilt adjusting mechanism. In this embodiment, a compression coil spring (a truncated-cone-shaped spring) 180 is used as the biasing device for biasing the annular radial surface 171c and the annular radial surface 172c in directions to bring the annular radial surface 171c and the annular radial surface 172c into contact with each other.

A third embodiment of the lens tilt adjusting mechanism will be hereinafter discussed with reference to FIGS. 6 through 11. This embodiment of the lens tilt adjusting mechanism is also applied to the zoom lens 10 shown in FIGS. 12 through 15. Elements or portions of this embodiment of the lens tilt adjusting mechanism which are similar to those of the first embodiment of the lens tilt adjusting mechanism are designated by the same reference numerals.

Figure 9:
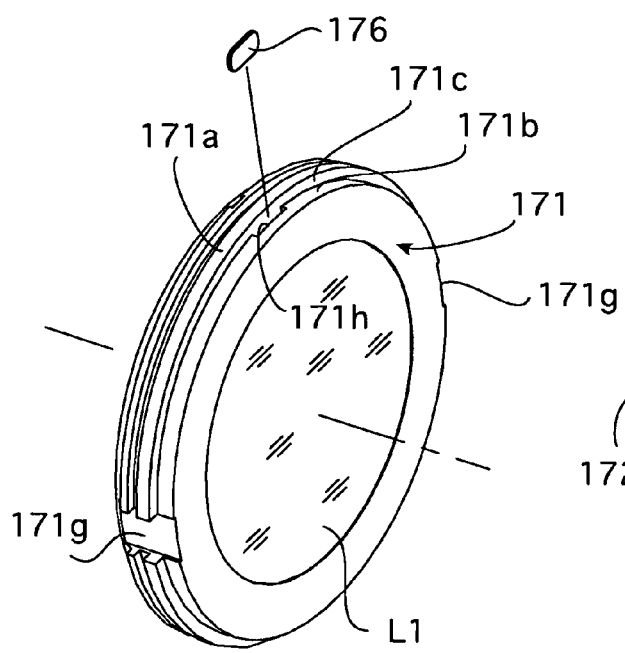
FIG. 9 is a perspective view of a lens frame and a tilt adjusting spacer of the third embodiment of the lens tilt adjusting mechanism.
Figure 10:
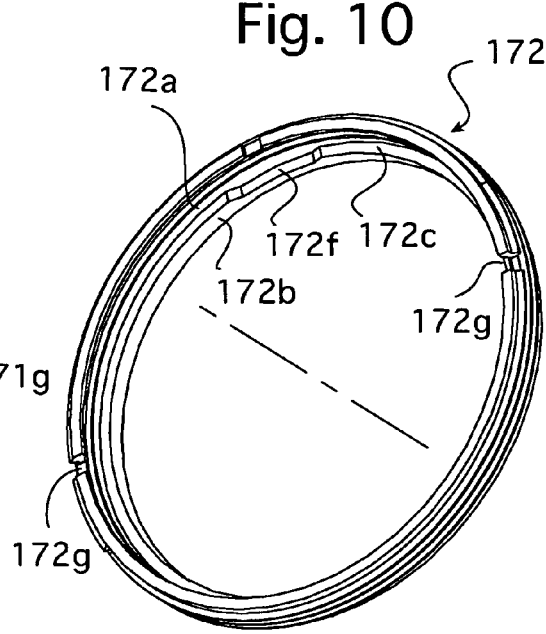
FIG. 10 is a perspective view of the lens frame holder of the third embodiment of the lens tilt adjusting mechanism.

The lens frame 171 is provided, on a portion of the small-diameter outer circumferential surface portion 171b which faces the annular radial surface 171c, with a spacer insertion groove (plate insertion groove) 171h which has a depth extending radially inwards so that a tilt adjusting spacer (tilt adjusting piece/tilt adjusting member) 176 made of, e.g., a small piece of metal plate, can be inserted into the spacer insertion groove 171h in a radial direction from the external side of the lens frame 171 (see FIG. 9). In a state where the tilt adjusting spacer 176 is installed in the spacer insertion groove 171h, a front flat surface of the tilt adjusting spacer 176 is in contact with the annular radial surface 171c. The spacer insertion groove 171h has that length (depth) in a direction parallel to the optical axis O which corresponds to the maximum assumed amount of tilting for adjustment so that the tilt adjusting spacer 176 having a thickness corresponding to the necessary amount of tilting for adjustment can be inserted into the spacer insertion groove 171h. Specifically, a plurality of tilt adjusting spacers 176 having different thicknesses are prepared in advance. In the third embodiment of the lens tilt adjusting mechanism, the recess 172f (see FIG. 10) of the lens frame holder 172 is formed on the annular radial surface 172c at a position thereon which corresponds to the spacer insertion groove 171h.

Figure 6:
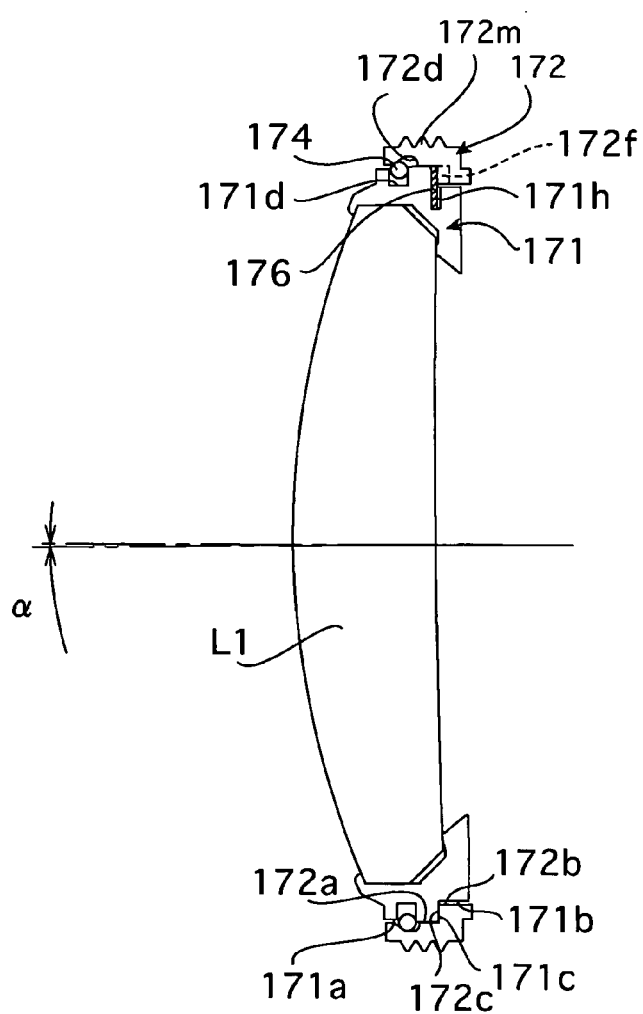
FIG. 6 is a view similar to that of FIG. 1, showing a third embodiment of the lens tilt adjusting mechanism in a tilt-angle adjusted state.
Figure 7:
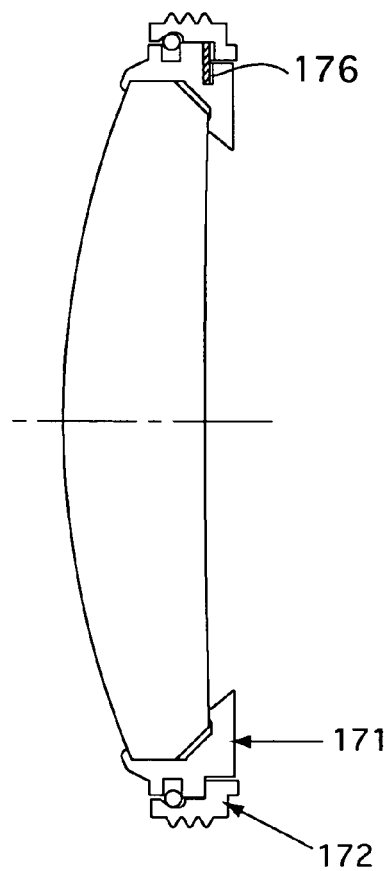
FIG. 7 is a view similar to that of FIG. 6, showing the third embodiment of the lens tilt adjusting mechanism in a tilt-angle non-adjusted state.
Figure 8:
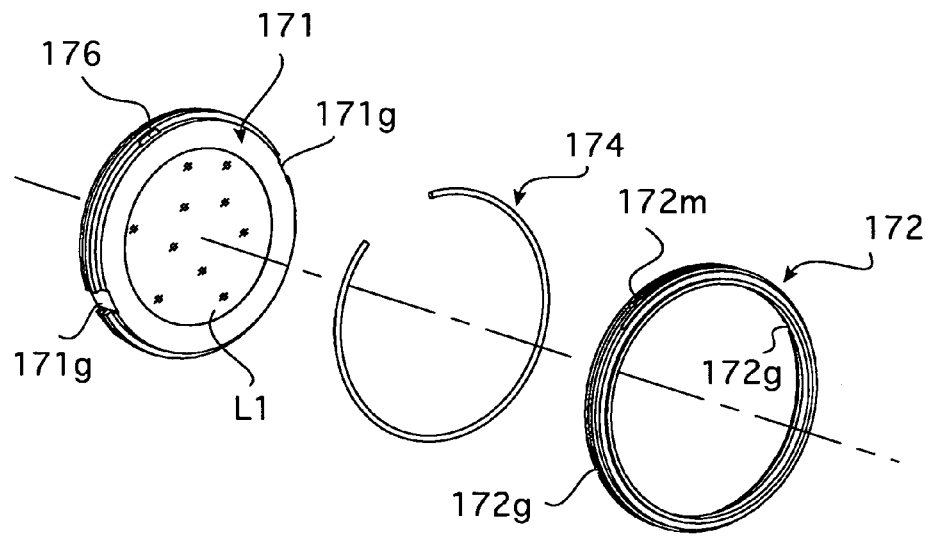
FIG. 8 is an exploded perspective view of the third embodiment of the lens tilt adjusting mechanism.

In the third embodiment of the lens tilt adjusting mechanism that has the above described structure, in one manner of usage, the tilt adjusting spacer 176 having a normal thickness is inserted into the spacer insertion groove 171h to be engaged in the recess 172f of the lens frame holder 172. This state corresponds to a normal state in which no lens tilt adjustment is necessary, and in which the annular radial surface 171c and the annular radial surface 172c are not prevented from being in intimate contact with each other, and accordingly, the axes of the lens frame 171 and the lens frame holder 172 remain coincident with each other (or remain parallel to each other) in such a normal state (see FIG. 7). On the other hand, when the lens tilt adjustment needs to be performed, the lens frame 171 is rotated relative to the lens frame holder 172 to bring the tilt adjusting spacer 176 into contact with the annular radial surface 172c. In this state where the tilt adjusting spacer 176 is in contact with the annular radial surface 172c, the axis of the lens frame 171 (i.e., the axis of the first lens group L1) tilts relative to the optical axis O by angle an α (see FIG. 6) with respect to the axis of the lens frame holder 172 as a reference axis corresponding to the optical axis O of the optical system of the zoom lens 10. The direction of this tilting can be changed by changing the rotational position of the lens frame 171 relative to the lens frame holder 172 (i.e., by changing the position of contact of the tilt adjusting spacer 176 with the annular radial surface 172c in a circumferential direction thereof). The lens frame 171 can be rotated relative to the lens frame holder 172 with the use of a pair of opposite recesses 171g (see FIGS. 8 and 9) which are formed on an outer peripheral surface of the lens frame 171 on 180-degree radially opposite sides thereof so that the lens frame 171 can be rotated with the use of a pin face wrench (not shown) with a pair of pins thereof being engaged in the pair of recesses 171g. In FIGS. 6 and 7, the tilt adjusting spacer 176 is hatched for the purpose of illustration.

When it is desired to change (increase or decrease) the amount of tilting of the lens frame 171 axis (i.e., the axis of the first lens group L1) relative to the optical axis O, only the tilt adjusting spacer 176 selected from among a plurality of tilt adjusting spacers having different thicknesses needs to be inserted into the spacer insertion groove 171h. Even if the tilt adjusting spacer 176 having a maximum thickness is inserted into the spacer insertion groove 171h, the C-shaped resilient ring 174 does not come off between the annular grooves 171d and the 172d, and accordingly, the C-shaped resilient ring 174 continuously biases the lens frame 171 and the lens frame holder 172 in directions to make the annular radial surface 171c and the annular radial surface 172c contact each other.

In the above described third embodiment of the lens tilt adjusting mechanism, although the recess 172f is formed on the annular radial surface 172c in the above described third embodiment of the lens tilt adjusting mechanism it is possible for the recess 172f not to be formed on the lens frame holder 172. In this alternative, the tilt adjusting spacer 176 is not inserted into the spacer insertion groove 171h if no lens tilt adjustment is necessary.

Similar to the first embodiment of the lens tilt adjusting mechanism, although the annular radial surface 171c and the annular radial surface 172c are biased by the spring force of the C-shaped resilient ring (biasing device) 174 in directions to bring the annular radial surface 171c and the annular radial surface 172c into contact with each other in the above illustrated embodiment of the zoom lens, there is a high degree of flexibility in the choice of the biasing device to be used in the third embodiment of the lens tilt adjusting mechanism shown in FIGS. 6 through 10.

Figure 11:
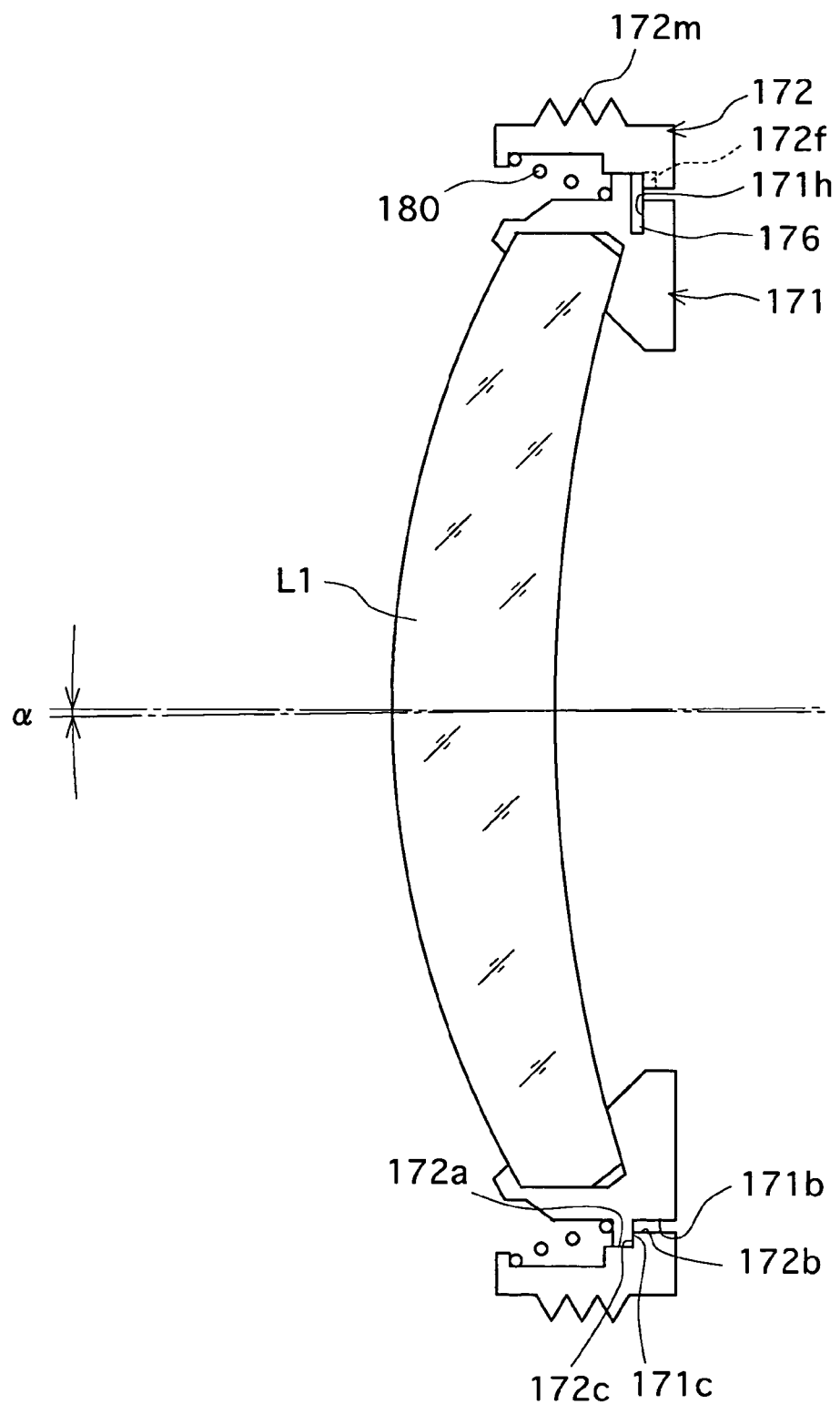
FIG. 11 is a longitudinal sectional view of a fourth embodiment of the lens tilt adjusting mechanism according to the present invention, wherein the biasing device is a compression coil spring.
Figure 12:
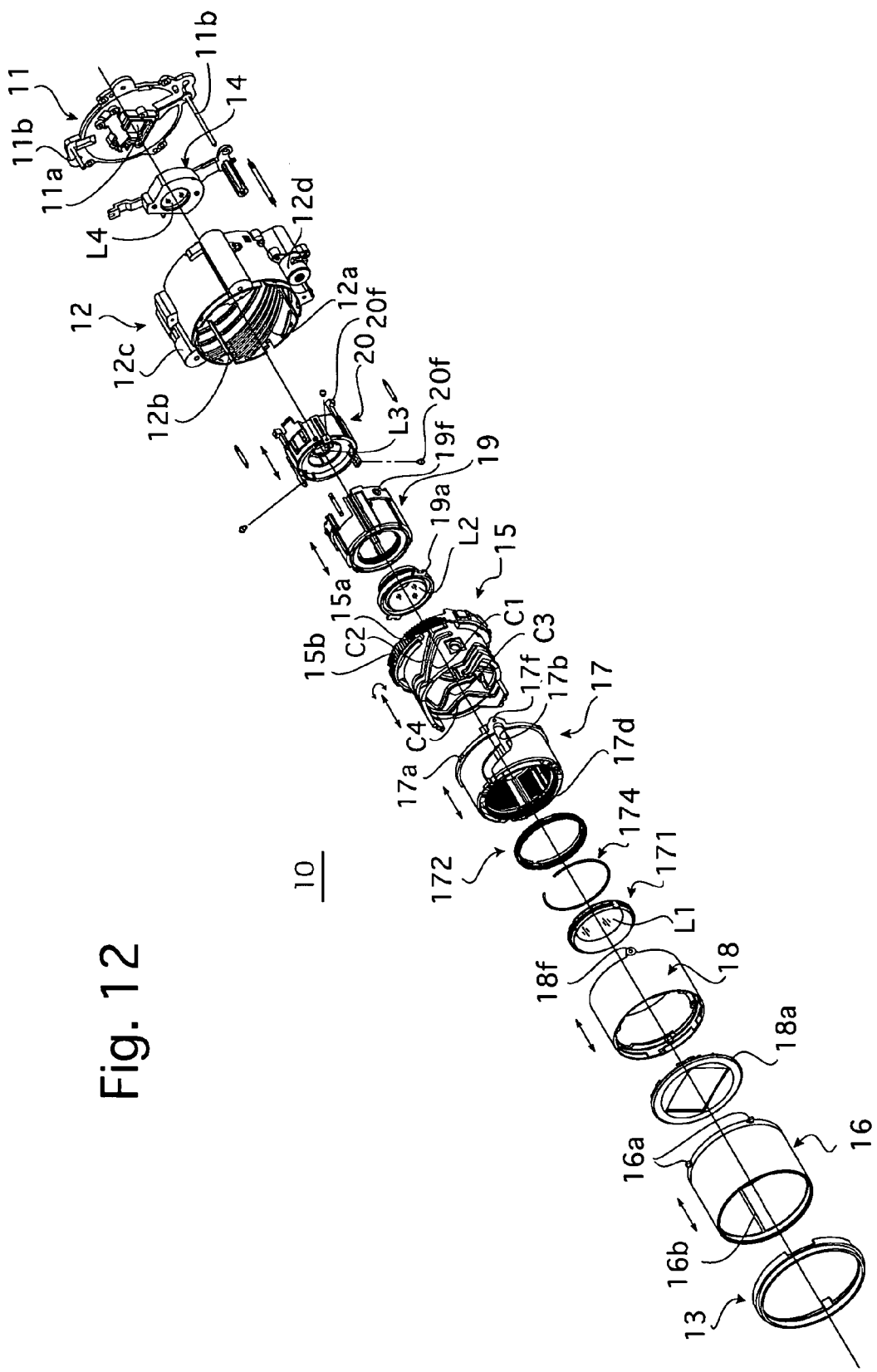
FIG. 12 is an exploded perspective view of an embodiment of a zoom lens to which a lens tilt adjusting mechanism according to the present invention is applied.
Figure 13:
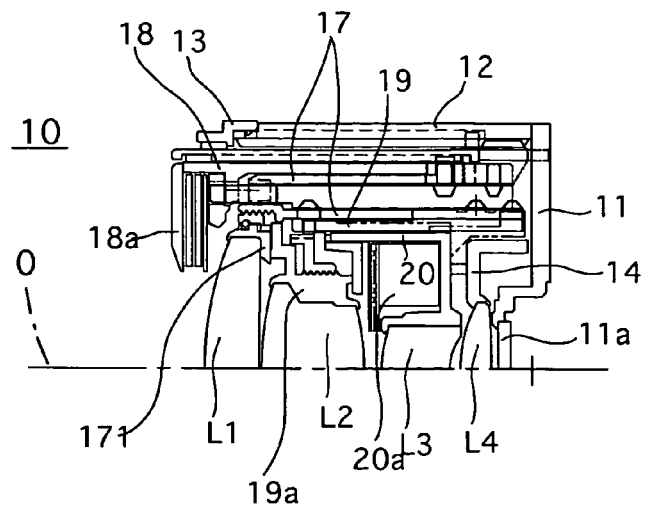
FIG. 13 is a longitudinal sectional view of the zoom lens shown in FIG. 12, showing only an upper half thereof from an optical axis in a fully retracted state.
Figure 14:
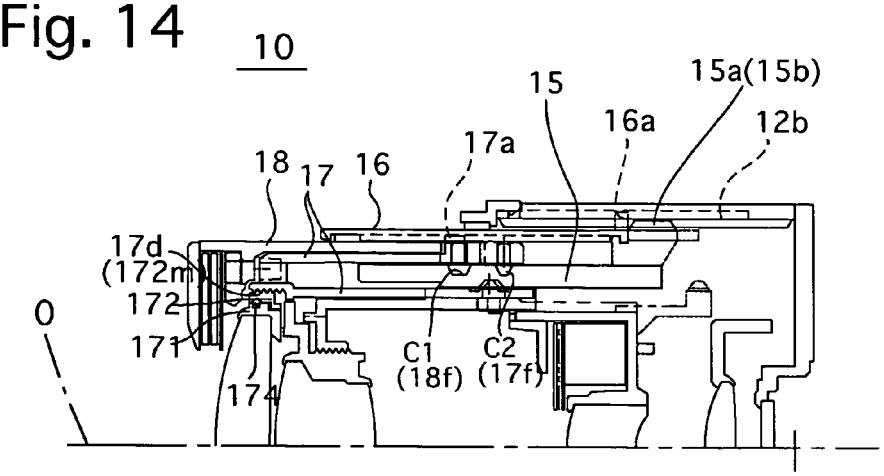
FIG. 14 is a view similar to that of FIG. 13, showing the zoom lens at wide-angle extremity.
Figure 15:
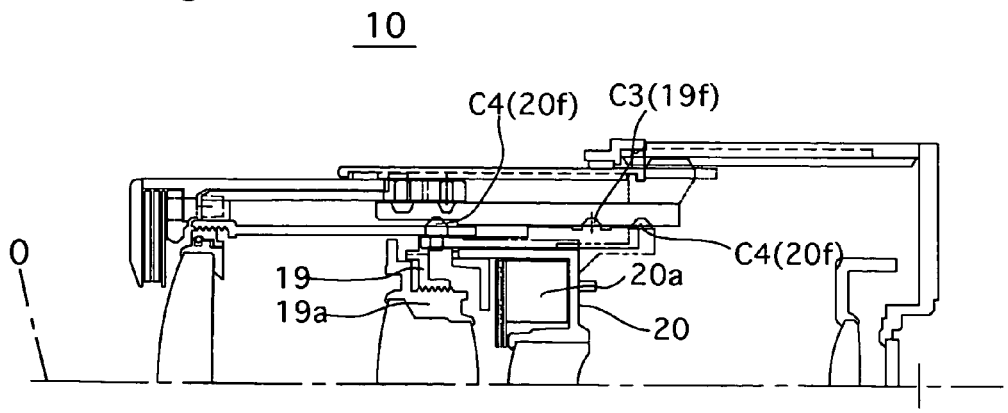
FIG. 15 is a view similar to that of FIG. 13, showing the zoom lens at telephoto extremity.

FIG. 11 shows a fourth embodiment of the lens tilt adjusting mechanism. In this embodiment, a compression coil spring (truncated-cone-shaped coil spring) 180 is used as the biasing device for biasing the annular radial surface 171c and the annular radial surface 172c in directions to bring the annular radial surface 171c and the annular radial surface 172c into contact with each other.

In the zoom lens 10 shown in FIGS. 12 through 15, the positions of the first lens group L1 and the second lens group L2 in the optical axis direction are adjusted for zoom adjustment that is carried out during assembly of the zoom lens 10. This zoom adjustment is carried out by moving the lens frame holder 172 in the optical axis direction via the engagement of the female thread portion 17d with the male thread portion 172m by rotating the lens frame holder 172 relative to the first lens group moving cylinder 17 with the use of a pin face wrench (not shown) with a pair of pins thereof being engaged in the pair of opposite recesses 172g (see FIGS. 3 and 4, or 8 and 9) formed on an inner peripheral surface of the lens frame 172 on 180-degree radially opposite sides thereof.

It will be easily understood by those skilled in the art that the zoom lens shown in FIGS. 12 through 15 is merely an example to which a lens tilt adjusting mechanism according to the present invention is applied and that the present invention can be applied to any other lens system or lens barrel.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A lens tilt adjusting mechanism comprising:
   a lens frame to which at least one lens element is fixed;
   a lens frame holder which holds said lens frame;
   axially-opposed radial surfaces formed on said lens frame and said lens frame holder, respectively;
   a biasing device for biasing said lens frame and said lens frame holder in directions to make said axially-opposed radial surfaces contact each other; and
   a protrusion formed on one of said axially-opposed radial surfaces and a recess formed on the other of said axially-opposed radial surfaces;
   wherein said axially-opposed radial surfaces are in intimate contact with each other in a state where said protrusion and said recess are engaged with each other; and
   wherein said lens frame tilts relative to said lens frame holder in a state where said protrusion is disengaged from said recess so that said protrusion is in contact with said other of said axially-opposed radial surfaces.

2. The lens tilt adjusting mechanism according to claim 1, wherein each of said axially-opposed radial surfaces lies in a plane substantially orthogonal to an optical axis of said lens element.

3. The lens tilt adjusting mechanism according to claim 1, wherein said biasing device comprises a coil spring.

4. The lens tilt adjusting mechanism according to claim 1, wherein said biasing device comprises a C-shaped resilient ring.

5. The lens tilt adjusting mechanism according to claim 4, further comprising:
   radially-opposed cylindrical surfaces formed on said lens frame and said lens frame holder, respectively, each of said radially-opposed cylindrical surfaces having an axial center coincident with an optical axis of said lens element;
   wherein said biasing device further includes radially-opposed annular grooves formed on said radially-opposed cylindrical surfaces, respectively; and
   wherein said C-shaped resilient ring is installed in between said radially-opposed annular grooves to extend therealong.

6. The lens tilt adjusting mechanism according to claim 1, wherein said lens frame holder is screw-engaged with a lens moving cylinder so that the position of said lens frame holder relative to said lens moving cylinder in an optical axis direction can be adjusted by adjusting the amount of screw-engagement of said lens frame holder with said lens moving cylinder.

7. The lens tilt adjusting mechanism according to claim 1, wherein said lens tilt adjusting mechanism is incorporated in a zoom lens.

8. The lens tilt adjusting mechanism according to claim 7, wherein said lens frame holder is guided along an optical axis of said zoom lens without rotating about said optical axis.

9. A lens tilt adjusting mechanism comprising:
   a lens frame to which at least one lens element is fixed;
   a lens frame holder which holds said lens frame;
   axially-opposed radial surfaces formed on said lens frame and said lens frame holder, respectively;
   a biasing device for biasing said lens frame and said lens frame holder in directions to make said axially-opposed radial surfaces contact each other;
   a spacer insertion groove formed on said axially-opposed radial surface of said lens frame, a depth of said spacer insertion groove extending in a radial direction of said lens frame; and
   a tilt adjusting spacer selectively inserted in said spacer insertion groove;
   wherein said axially-opposed radial surfaces are in intimate contact with each other in a state where said tilt adjusting spacer is not inserted in said spacer insertion groove; and
   wherein said lens frame tilts relative to said lens frame holder by a tilting angle corresponding to the thickness of said tilt adjusting spacer in a state where said tilt adjusting spacer is inserted in said spacer insertion groove.

10. The lens tilt adjusting mechanism according to claim 9, wherein each of said axially-opposed radial surfaces lies in a plane substantially orthogonal to an optical axis of said lens element.

11. The lens tilt adjusting mechanism according to claim 9, wherein said biasing device comprises a coil spring.

12. The lens tilt adjusting mechanism according to claim 9, wherein said biasing device comprises a C-shaped resilient ring.

13. The lens tilt adjusting mechanism according to claim 12, further comprising:
   radially-opposed cylindrical surfaces formed on said lens frame and said lens frame holder, respectively, each of said radially-opposed cylindrical surfaces having an axial center coincident with an optical axis of said lens element;
   wherein said biasing device further includes radially-opposed annular grooves formed on said radially-opposed cylindrical surfaces, respectively; and
   wherein said C-shaped resilient ring is installed in between said radially-opposed annular grooves to extend therealong.

14. The lens tilt adjusting mechanism according to claim 9, further comprising a recess which is formed on said axially-opposed radial surface of said lens frame holder to correspond to the position of said spacer insertion groove of said lens frame, said tilt adjusting spacer being engageable in said recess.

15. The lens tilt adjusting mechanism according to claim 9, wherein said lens frame holder is screw-engaged with a lens moving cylinder so that the position of said lens frame holder relative to said lens moving cylinder in an optical axis direction can be adjusted by adjusting the amount of screw-engagement of said lens frame holder with said lens moving cylinder.

16. The lens tilt adjusting mechanism according to claim 9, wherein said lens tilt adjusting mechanism is incorporated in a zoom lens.

17. The lens tilt adjusting mechanism according to claim 16, wherein said lens frame holder is guided along an optical axis of said zoom lens without rotating about said optical axis.

* * * * *